(12) United States Patent
Meade

(10) Patent No.: US 8,938,907 B2
(45) Date of Patent: Jan. 27, 2015

(54) ANTI-SNAG FISHING DEVICE

(75) Inventor: Robbie Meade, Bannockburn (AU)

(73) Assignee: Memo Fishing Innovations Pty Ltd, Teesdale (AU)

( * ) Notice: Subject to any disclaimer, the term of this patent is extended or adjusted under 35 U.S.C. 154(b) by 766 days.

(21) Appl. No.: 12/569,726

(22) Filed: Sep. 29, 2009

(65) Prior Publication Data

US 2010/0083559 A1    Apr. 8, 2010

Related U.S. Application Data

(63) Continuation of application No. PCT/AU2008/000452, filed on Mar. 28, 2008.

(30) Foreign Application Priority Data

Mar. 30, 2007    (AU) ................ 2007901715

(51) Int. Cl.
*A01K 85/02*    (2006.01)
*A01K 85/00*    (2006.01)
*A01K 85/08*    (2006.01)

(52) U.S. Cl.
CPC ............... *A01K 85/02* (2013.01); *A01K 85/08* (2013.01)
USPC ......... 43/42.1; 43/42.47; 43/42.09; 43/42.24; 43/42.29; 43/42.37; 43/42.38; 43/42.4; 43/42.43

(58) Field of Classification Search
USPC .............. 43/42.47, 42.04, 42.09, 42.1, 42.24, 43/42.26, 42.28, 42.29, 42.3, 42.37, 42.38, 43/42.4, 42.41, 42.43
See application file for complete search history.

(56) References Cited

U.S. PATENT DOCUMENTS

| | | | | | |
|---|---|---|---|---|---|
| 808,239 | A | * | 12/1905 | Homan | 43/42.43 |
| 1,272,183 | A | * | 7/1918 | Arnold | 43/42.29 |
| 1,538,909 | A | * | 5/1925 | Shannon | 43/42.29 |
| 1,709,010 | A | * | 4/1929 | Foss | 43/42.47 |
| 1,803,777 | A | * | 5/1931 | Speich | 43/42.28 |
| 1,806,088 | A | * | 5/1931 | Schnell | 43/42.43 |
| 2,163,378 | A | * | 6/1939 | Horvath | 43/42.41 |

(Continued)

FOREIGN PATENT DOCUMENTS

| | | | | | |
|---|---|---|---|---|---|
| JP | 03272633 | A | * | 12/1991 | A01K 85/02 |
| JP | 09191795 | A | * | 7/1997 | A01K 85/02 |

(Continued)

OTHER PUBLICATIONS

International Preliminary Report on Patentability issued in connection with International Patent Application No. PCT/AU2008/000452, completed Aug. 3, 2009 3 pages.

(Continued)

*Primary Examiner* — Darren W Ark
(74) *Attorney, Agent, or Firm* — Hanley, Flight and Zimmerman, LLC

(57) ABSTRACT

Anti-snag fishing devices suitable for attachment to a fishing hook are disclosed. The fishing hook has a hook eye, a shank, at least one curved hook section and at least one hook point. The anti-snag fishing device includes an elongated body member which when fitted to the fishing hook forms an arc which projects upwardly from at or near the hook eye, reaches its highest point above the plane of the hook point substantially parallel to the shank, then projects downwardly passing by and under the hook point, where it terminates behind the curved section of the fishing hook.

27 Claims, 11 Drawing Sheets

(56) References Cited

U.S. PATENT DOCUMENTS

| | | | | |
|---|---|---|---|---|
| 2,185,507 A * | 1/1940 | Knapp | | 43/43.2 |
| 2,319,686 A * | 5/1943 | Janisch | | 43/42.43 |
| 2,443,753 A * | 6/1948 | Tusa | | 43/42.41 |
| 2,456,705 A * | 12/1948 | Herring | | 43/42.41 |
| 2,462,828 A * | 2/1949 | Parnell, Sr. | | 43/42.4 |
| 2,476,126 A * | 7/1949 | Weiss | | 43/44.2 |
| 2,476,733 A * | 7/1949 | Jacobs | | 43/42.1 |
| 2,492,064 A * | 12/1949 | Rauh | | 43/43.2 |
| 2,558,121 A * | 6/1951 | Bailey | | 43/42.41 |
| 2,563,825 A * | 8/1951 | Ebert | | 43/42.24 |
| 2,567,813 A * | 9/1951 | Hyland | | 43/42.41 |
| 2,569,642 A * | 10/1951 | Schnabel | | 43/42.41 |
| 2,586,186 A * | 2/1952 | Swanberg | | 43/42.29 |
| 2,611,208 A * | 9/1952 | Alexath | | 43/42.41 |
| 2,629,199 A * | 2/1953 | Larson | | 43/42.41 |
| 2,635,381 A * | 4/1953 | Coons | | 43/42.43 |
| 2,675,639 A * | 4/1954 | Borgen | | 43/42.41 |
| 2,767,503 A * | 10/1956 | Fisher | | 43/42.43 |
| 2,785,498 A * | 3/1957 | Youngquist et al. | | 43/43.4 |
| 2,789,387 A * | 4/1957 | Plummer, Jr. | | 43/42.43 |
| 2,797,519 A * | 7/1957 | Keller | | 43/42.37 |
| 2,812,609 A * | 11/1957 | Lema | | 43/42.38 |
| 2,817,922 A * | 12/1957 | Takeshita | | 43/42.37 |
| 3,040,466 A * | 6/1962 | Jablonski | | 43/42.43 |
| 3,231,999 A * | 2/1966 | Gurka | | 43/42.43 |
| 3,260,012 A * | 7/1966 | Stolzer | | 43/42.1 |
| 3,400,484 A * | 9/1968 | Beard | | 43/42.38 |
| 3,640,014 A * | 2/1972 | Gurka | | 43/42.43 |
| 3,693,279 A * | 9/1972 | Mackie | | 43/42.28 |
| 3,731,419 A * | 5/1973 | Candy | | 43/42.41 |
| 3,964,203 A * | 6/1976 | Williams, Jr. | | 43/42.29 |
| 4,051,619 A * | 10/1977 | McClellan | | 43/42.41 |
| 4,367,607 A * | 1/1983 | Hedman | | 43/42.1 |
| 4,596,086 A * | 6/1986 | Garland | | 43/42.4 |
| 4,619,069 A * | 10/1986 | Strickland | | 43/42.26 |
| 4,660,318 A * | 4/1987 | Mieno | | 43/42.39 |
| 4,771,568 A * | 9/1988 | Head | | 43/42.29 |
| 4,777,758 A * | 10/1988 | Phillips | | 43/42.09 |
| 4,817,325 A * | 4/1989 | Thomas | | 43/42.1 |
| 4,864,766 A * | 9/1989 | Bohn | | 43/42.37 |
| 4,869,012 A * | 9/1989 | Brenholt | | 43/42.1 |
| 4,893,431 A * | 1/1990 | Ehlers | | 43/42.47 |
| 4,926,578 A * | 5/1990 | Morse et al. | | 43/42.28 |
| 4,932,153 A * | 6/1990 | Paluzzi | | 43/43.4 |
| 5,228,230 A * | 7/1993 | Vaught | | 43/42.41 |
| 5,438,790 A * | 8/1995 | Rigney | | 43/42.24 |
| 5,490,346 A * | 2/1996 | Guest | | 43/42.4 |
| 5,524,377 A * | 6/1996 | Freeman et al. | | 43/42.3 |
| 6,164,006 A * | 12/2000 | Peterson | | 43/42.09 |
| 6,516,552 B2 * | 2/2003 | Hawkins | | 43/42.09 |
| 6,618,979 B2 * | 9/2003 | Wacha | | 43/42.47 |
| 6,772,553 B2 * | 8/2004 | Phillips et al. | | 43/42.4 |
| 7,140,147 B2 * | 11/2006 | Wacha | | 43/42.47 |
| 7,263,798 B2 * | 9/2007 | Nichols | | 43/42.09 |
| 7,469,497 B2 * | 12/2008 | Hergott | | 43/42.1 |
| 7,637,050 B2 * | 12/2009 | Brick | | 43/42.47 |
| D637,688 S * | 5/2011 | Norton et al. | | D22/144 |
| 7,963,066 B2 * | 6/2011 | Perrick | | 43/42.47 |
| D648,415 S * | 11/2011 | Jarboe et al. | | D22/144 |
| 8,713,847 B2 * | 5/2014 | Polachek | | 43/42.47 |
| 2006/0037232 A1 * | 2/2006 | Gill | | 43/42.28 |
| 2006/0236588 A1 * | 10/2006 | Rapelje | | 43/42.09 |
| 2008/0202018 A1 * | 8/2008 | Gill | | 43/42.43 |
| 2014/0059916 A1 * | 3/2014 | Culver et al. | | 43/42.1 |

FOREIGN PATENT DOCUMENTS

| | | | | |
|---|---|---|---|---|
| JP | 2009072109 A * | 4/2009 | | A01K 85/02 |
| JP | 2009089707 A * | 4/2009 | | A01K 85/02 |
| JP | 2010057404 A * | 3/2010 | | A01K 85/02 |
| JP | 2011193862 A * | 10/2011 | | A01K 85/02 |

OTHER PUBLICATIONS

International Search Report issued in connection with International Patent Application No. PCT/AU2008/000452, completed May 30, 2008, mailed Jun. 6, 2008, 4 pages.

Written Opinion of the International Preliminary Examining Authority, issued in connection with International Patent Application No. PCT/AU2008/000452, mailed Apr. 15, 2009, 3 pages.

Written Opinion of the International Searching Authority, issued in connection with International Patent Application No. PCT/AU2008/000452, completed May 30, 2008, mailed Jun. 6, 2008, 6 pages.

* cited by examiner

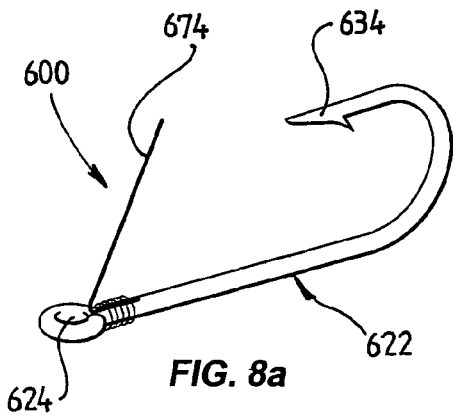
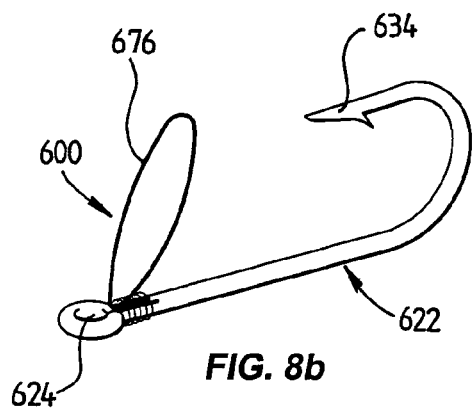
FIG. 8a
FIG. 8b
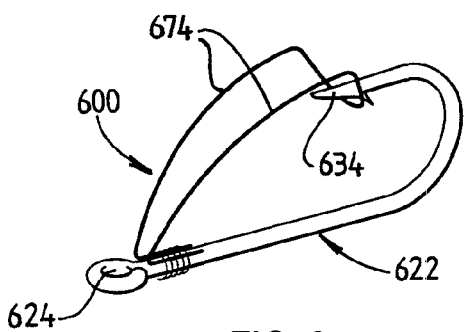
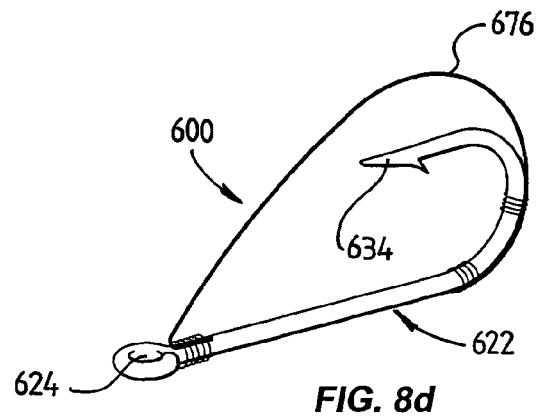
FIG. 8c
FIG. 8d
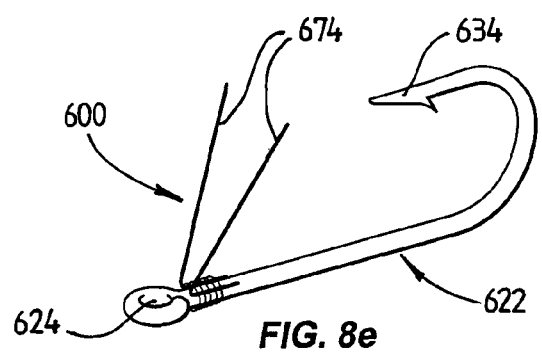
FIG. 8e
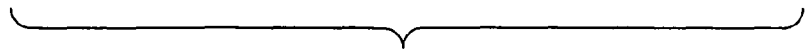
FIG. 8 *Prior Art*

ANTI-SNAG FISHING DEVICE

RELATED APPLICATION

This patent arises from a continuation of International Patent Application Serial No. PCT/AU2008/000452, which is hereby incorporated by reference in its entirety.

FIELD OF THE DISCLOSURE

The present disclosure relates, generally, to fishing devices, or "tackle", and relates particularly, though not exclusively, to anti-snag fishing lures and/or anti-snag guards for fishing lures or hooks, in which the hook(s) is/are protected against snagging on foreign matter during use.

BACKGROUND

Fishing lures in various forms have been available for many years. Almost all lures are designed to resemble fish prey, and are equipped with one or more hooks that are used to catch fish. Most lures are operated with casting and retrieval techniques. Their movements during retrieval may simulate swimming prey in order to attract fish. Some fish can also be attracted by sound as lures are pulled through the water. For this reason some lures include devices such as rattles to assist with catching fish.

Hard bodied lures, such as, for example, so called 'spinners', 'plugs' or 'wobblers', are designed to be cast using spin or bait casting reels and rods. Most hard body lures are fitted with treble hooks as they are very effective at hooking fish. These lures tend to have sufficient weight to be cast without the need of additional tackle such as sinkers or the like. Some hard body lures have bibs, or swim lips, that in combination with the body shape and configuration of the lure enable the lure to move, dart or vibrate as it is wound or reeled in. This particular movement is considered to be very advantageous when fishing for most fish species.

In fly fishing, fish are caught by using an artificial fly lure that is cast with a fly rod and a fly line. The fly line is generally coated with plastic such that it is heavy enough to send a fly to a target area. Traditionally, flies have been created by tying hair, fur, feathers and/or other materials onto a hook with thread. The flies are tied and materials arranged in sizes and colours to match local terrestrial and aquatic insects and other fish food attractive to the target fish species.

Traditional flies tend to come in one of two basic forms, namely in a wet or dry fly format. As the name suggests, wet flies are designed to be fully or partially submerged during use, whilst dry flies are only fished on the water surface. Dry flies tend to imitate insects or animals that might land on or emerge from the water's surface, such as, for example, dragonflies, frogs or grasshoppers. Wet or subsurface flies often resemble aquatic animals, as for example, baitfish, prawns, or crabs or resemble insect larvae.

Unlike hard bodied lures that can be easily cast due to their weight, fly fishing relies on the rhythm imparted to the fly rod and fly line, with the fly trailing, to project the fly to a target fishing area. Holding the fly rod in one hand and the fly line down by the reel with the other, an angler must work line out of the reel a bit at a time whilst at the same time casting the rod back and forth, this action is known as 'false casting'. When desired on a forward cast, as the fly is pulled forward by the momentum imparted by the fly rod, the angler can let go of the fly line allowing the fly to project forward to the target fishing area. The fly then lands on the water surface awaiting an unsuspecting fish to strike.

Due to the nature of the design of existing flies, most tend to rely primarily on the materials used in their construction to provide movement, or to add life, to the fly. There have been many attempts to incorporate bibs, or swim lips, on flies so that they too will dart or vibrate when drawn through the water. However, due to the mechanical motion of false casting, protruding bibs more often than not cause drag when casting which can result in flies spinning severely, making it difficult, if not impossible, to cast the required distance. Aside from casting difficulties, a spinning fly can also lead to a badly tangled fly line.

One of the most frustrating problems faced by anglers, whether using hard body lures or flies, is the tendency of hooks or lures to get snagged on foreign matter during use. Snagging commonly results in loss of the lure and/or other tackle since retrieval of that tackle is generally not possible after snagging. Aside from being frustrating and time consuming given the time it takes to re-rig a fishing line, the loss of tackle due to snagging can be an expensive exercise, as the cost of replacement of tackle can be high.

In view of this problem, many anti-snag devices have been developed over the years in an attempt to minimise or eliminate hooks from snagging. Most known anti-snag devices utilise trailing pieces, or loops, of wire or monofilament attached to the lure which serve to deflect foreign matter away from the lure during use, so that the lure does not become snagged.

BRIEF DESCRIPTION OF THE DRAWINGS

There shall now be described in detail preferred constructions of an anti-snag fishing device constructed in accordance with the teachings of the invention. The ensuing description is given by way of non-limitative example only and is with reference to the accompanying drawings, wherein:

FIG. 2b is a perspective view of a fly rod having a tangled fly line which often occurs when using a prior art fly fishing lure incorporating a bib, or swim lip, such as the lure shown in FIG. 2a;

FIGS. 8a to 8e are perspective views of prior art anti-snag guards for fishing lures or hooks, these prior art guards being constructed out of pieces, or loops, or wire or monofilament;

FIG. 10a is a perspective view of the deflector portion of the anti-snag guard of FIG. 9a;

FIG. 10b is a perspective view of an alternative form of a deflector portion which may also be used in accordance with the teachings of the present disclosure;

DETAILED DESCRIPTION

Figure 1:
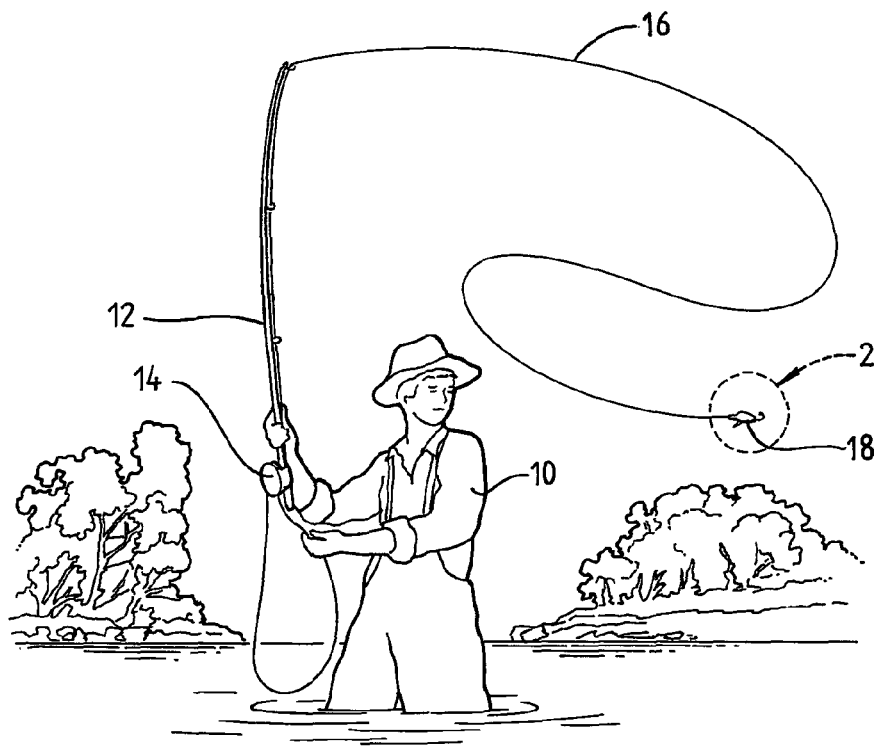
FIG. 1 is a perspective view depicting a fisherman practicing the art of fly fishing utilising a fly rod, a fly reel and a fly line, the end of the fly line having a fly fishing lure attached thereto.

In FIG. 1 a fisherman 10 is shown practicing the art of fly fishing utilising a fly fishing rod 12, a fly fishing reel 14 and fly fishing line 16, the end of fly fishing line 16 is shown having a fly fishing lure 18 (hereinafter simply referred to as "fly lure(s) 18") affixed thereto.

In order to cast fly lure 18, fisherman 10 must rely on the rhythm imparted to fly fishing rod 12 (hereinafter simply referred to as "rod 12") and fly fishing line 16 (hereinafter simply referred to as "line 16"), with fly lure 18 trailing, to project fly lure 18 to a target fishing area. Holding rod 12 in one hand, and line 16 down by fly fishing reel 14 (hereinafter simply referred to as "reel 14") with the other, fisherman 10 must work line 16 out of reel 14 a bit at a time whilst at the same time casting rod 12 back and forth, this action is known as 'false casting'. When desired on a forward cast, as fly lure 18 is pulled forward by the momentum imparted by rod 12, fisherman 10 can let go of line 16 allowing fly lure 18 to project forward to the target fishing area. Fly lure 18 can then land on the water surface awaiting an unsuspecting fish (not shown) to strike.

Figure 2A:
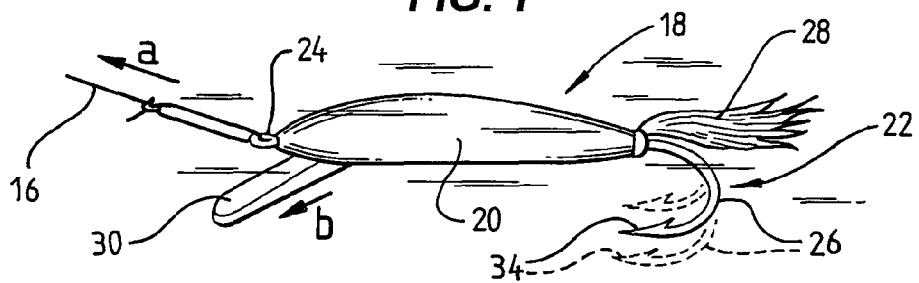
FIG. 2a is an enlarged side view of the circled region of FIG. 1, illustrating the configuration and design of a prior art fly fishing lure incorporating a bib, or swim lip.
Figure 2B:
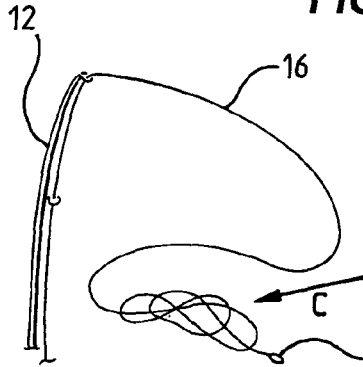
Figure 2C:
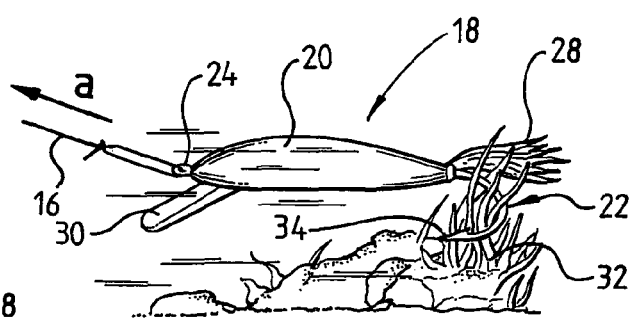
FIG. 2c is a side view of the prior art fly fishing lure of FIG. 2a, this time showing the lure snagged on reeds under the water surface.

The configuration of one form of prior art fly lure 18 is shown in FIG. 2a. FIGS. 2b & 2c are provided to illustrate the sort of problems that may be faced when using this type of prior art fly lure 18.

Prior art fly lure 18 includes a body portion 20 which is typically constructed of a light weight material that may be hard or soft depending on the fish prey or food fly lure 18 is designed to resemble. Body portion 20 of prior art fly lure 18 substantially surrounds the shank or shaft (not shown) of a fishing hook 22, between its eye 24 and curved or hooked section 26. Disposed at the trailing end of body portion 20 of prior art fly lure 18, adjacent curved section 26 of hook 22, is a feather, hair and/or any other suitable luring means 28 that is intended to entice a fish (not shown) to strike at prior art fly lure 18. At the forward end of prior art fly lure 18, adjacent hook eye 24, is disposed a downwardly projecting bib or swim lip 30 that enables fly lure 18 to move and/or vibrate when drawn through water. In use, when fisherman 10 applies a pulling force to line 16 in the direction of arrow a, prior art fly lure 18 is drawn through, or across, the water towards fisherman 10. As fly lure 18 is drawn towards fisherman 10, bib 30 causes fly lure 18 to continually attempt to dive in the direction of arrow b which as a result thereof causes prior art fly lure 18 to move and/or vibrate as it is drawn through the water. In FIG. 2a, the curved section 26 of hook 22 is shown in solid and phantom lines to demonstrate that prior art fly lure 18 moves and/or vibrates as it is drawn through, or across, the water. This type of movement of fly lure 18 is considered to be very advantageous as it is believed to 'add life' to the lure 18 which generally improves ones chances of catching fish.

The addition of bib 30 to prior art lure 18 does, however, have its drawbacks. Due to the mechanical motion of false casting, protruding bibs 30 tend to cause drag during casting which can result in flies 18 spinning severely, making it difficult, if not impossible, to cast the required distance. Aside from casting difficulties, a spinning fly can also lead to a badly tangled line 16 which is generally indicated by arrow c in FIG. 2b.

One of the most frustrating problems faced by a fisherman 18, when using prior art fly lures 18 of the type shown in FIG. 2a, is the tendency of hook 22 of the fly lure 18 to get snagged on foreign matter during use. In FIG. 2c, hook 22 of prior art fly lure 18 is shown snagged on reeds 32 as a result of fly lure 18 being drawn through reeds 32 during use. As the plane of the hook point 34, of hook 22 of prior art fly lure 18, is not protected by any part of fly lure 18, snagging is generally unavoidable when fly fishing in snag infested waters. Snagging commonly results in loss of fly lure 18 and/or other tackle since retrieval of that tackle is generally not possible after snagging.

Figure 3:
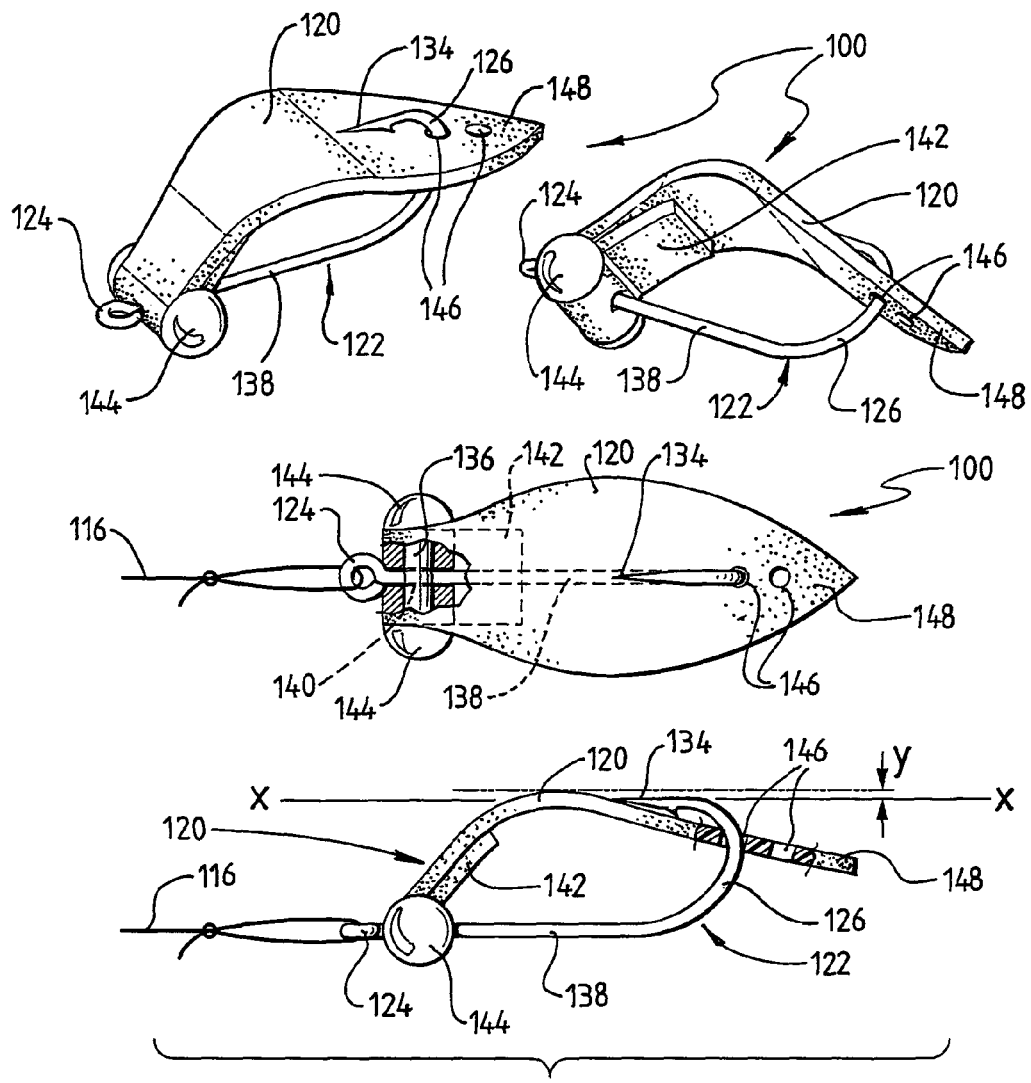
FIG. 3 illustrates various views of a first example anti-snag fly fishing lure made in accordance with the teachings of the present disclosure.

In FIG. 3, there is shown various views of a first example fly fishing lure 100 (hereinafter simply referred to as "lure 100") made in accordance with the teachings of the present disclosure. Although specifically described as being suitable for fly fishing, it should be understood that lure 100 of the present disclosure may also be used with a spinning reel and rod, or the likes, and as such the disclosure should not be construed as limited to fly fishing use alone.

In order to simplify the discussion of the preferred examples of the anti-snag fishing devices that now follow, like reference numerals to those used in FIGS. 2a to 2c to define prior art fly lure 18 will be used to define like parts of the anti-snag fishing devices depicted in FIGS. 3 to 16.

Referring to FIG. 3, it can be seen that lure 100 includes an elongated body 120, which when fitted to a fishing hook 122 forms an arc which projects upwardly from near the hook eye 124, reaches its highest point above the plane x of the hook point 134, then projects downwardly passing by and under hook point 134, until it finally terminates behind the curved or hook section 126 of hook 122. The arced design of elongated body 120, of lure 100, provides a means of deflecting foreign matter (not shown) away from hook point 134 during use, so that lure 100 does not readily become snagged. As the highest point of the arc of body 120 is positioned above the plane x of hook point 134 by a distance y, lure 100 is less prone to snagging when drawn through snag infested waters.

Elongated body 120 of lure 100 may be constructed of any suitable material, but is preferably constructed of a soft or pliable material that is normally biased to its arced position such that hook point 134 is only exposed upon downward pressure being applied to body 120 which results in the arc of body 120 being deformed. In this way, hook point 134 of lure 100 is unlikely to be exposed during use, until such a time that a fish 150 (see FIG. 5d) strikes at lure 100.

The fitting of elongated body 120 of lure 100 to hook 122 may be done in a plurality of different ways. There are many such ways of connecting body 120 to hook 122, and as such the present disclosure should not be construed as limited to the specific examples depicted in the drawings.

In FIG. 3, a preferred means of fitting elongated body 120 to hook 122 of lure 100 is shown. This preferred means of attachment of body 120 to hook 122 of lure 100 utilises a cylinder or shaft 136 that is disposed at right angles to the shank 138 of hook 122. Shaft 136 includes a hole, or recess 140, for receiving shank 138 of hook 122. When suitably positioned, and hence, attached to shank 138, shaft 136 may be glued into place to maintain its position. An alternative means of maintaining the position of shaft 136, relative to shank 138, could be to utilise a shaft 136 constructed of a rubber, or plastics, material that includes a hole or recess 140 that provides a frictional connection when fitted to hook 122. To complete the attachment of elongated body 120 to shaft 136, elongated body 120 includes a tongue portion 142, having a slot, a hole, or series of holes (not shown), provided therein for receiving hook eye 124 and shank 138, that can be wrapped around shaft 136 and then glued (or the likes) to the underside of body 120 to maintain its connection to lure 100.

By way of the preferred means of attachment of elongated body 120 to hook 122 of lure 100 shown in FIG. 3, the exposed ends of shaft 136 provide a convenient location for attachment of decorative eyes or other shiny or similar objects 144 that help to make lure 100 appear more 'life-like' when drawn through the water during use.

To ensure that the arced arrangement of elongated body 120 of lure 100 is maintained during use, at least one slot or hole 146 is provided near the tail 148 of lure 100 for receiving curved section 126 of hook 122 therein. By providing more than one hole 146 in tail 148 of body 120, as is shown in FIGS. 3 & 5a to 5d (whereas a single hole of slot is shown in the examples of FIGS. 6a to 6c, and FIGS. 7a & 7b), the degree of the arc of elongated body 120 of lure 100 can be altered to suit varying fishing scenarios.

Figure 5A:
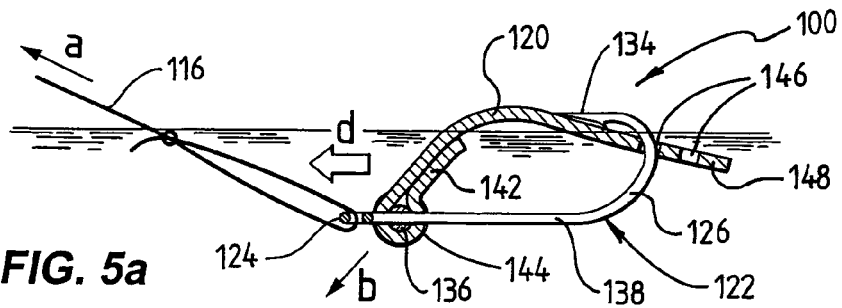
FIGS. 5a & 5b are cross-sectional side views of the anti-snag fly fishing lure of FIG. 3, each showing a different arced configuration of the body of the lure which is achievable by altering the position of the hook relative to holes provided in the tail of the body of the lure.
Figure 5B:
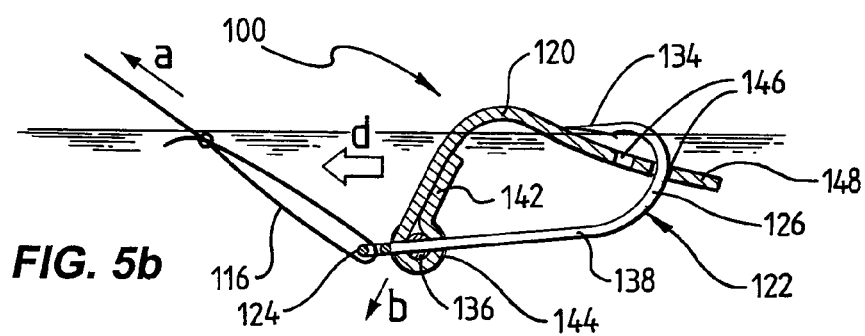

In FIG. 5a, curved section 126 of hook 122 has been positioned in the forward hole 146 of elongated body 120 of lure 100, whilst in FIG. 5b the rear hole 146 is used to maintain the arc of elongated body 120 of lure 100. The varying arced configuration of elongated body 120 provided by way of forward, rear, or further (not shown) holes 146 (see FIGS. 5a & 5b), results in varied movement of lure 100 in the direction of arrow d as a pulling force is selectively applied to line 116 in the direction of arrow a, by fisherman 110 (not shown).

Figure 5C:
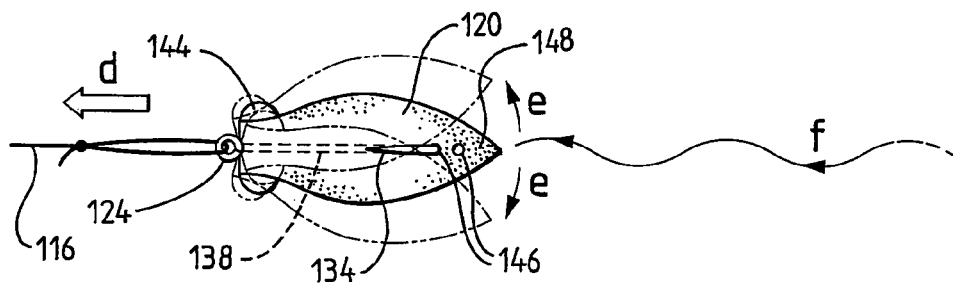
FIG. 5c is a partial cross-sectional plan view of the anti-snag fly fishing lure of FIG. 3, illustrating the way in which the lure moves and/or vibrates as it is drawn through the water.
Figure 5D:
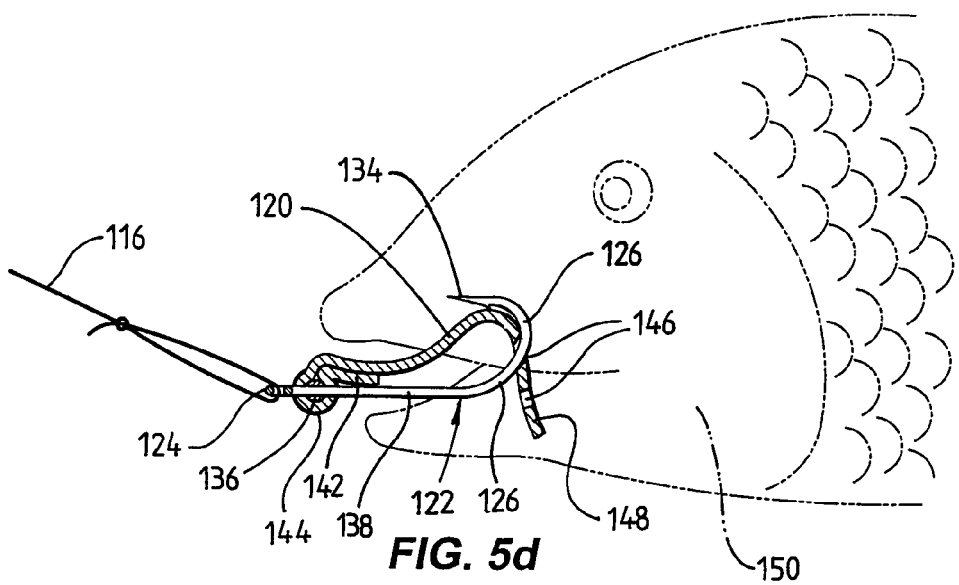
FIG. 5d is a cross-sectional side view of the anti-snag fly fishing lure of FIG. 3, this time illustrating the way in which the hook point of the lure is exposed upon a fish striking at same.

No matter how the degree of the arc of elongated body 120 of lure 100 is maintained relative to curved section 126 of hook 122, the general arced design of elongated body 120 acts like a bib, or a swim lip of prior art lures, which enables lure 100 to move and/or vibrate when drawn through the water. In FIGS. 5a to 5c, it can be seen that as lure 100 is drawn through, or across, the water in the direction of arrow d, lure 100 has a tendency to dive in the direction of arrow b due to the arced design of body 120, which results in lure 100 wobbling and/or vibrating from side to side, as indicated by arrows e (see FIG. 5c), which in turn results in lure 100 following a substantially serpentine path as is indicated by arrow f.

In terms of fly fishing, this type of movement is considered especially advantageous and has not before been achievable without the addition of a conventional bib which, as already discussed, can cause spinning of a lure during false casting, leading to casting difficulties and/or line tangling. Lure 100 of the present disclosure does not suffer from the problems inherent with the addition of a bib since arced body 120 of lure 100 does not protrude below hook eye 124 of hook 122, which in terms of bibs, is seen as the major cause of the undesired spinning of known lures.

Figure 4A:
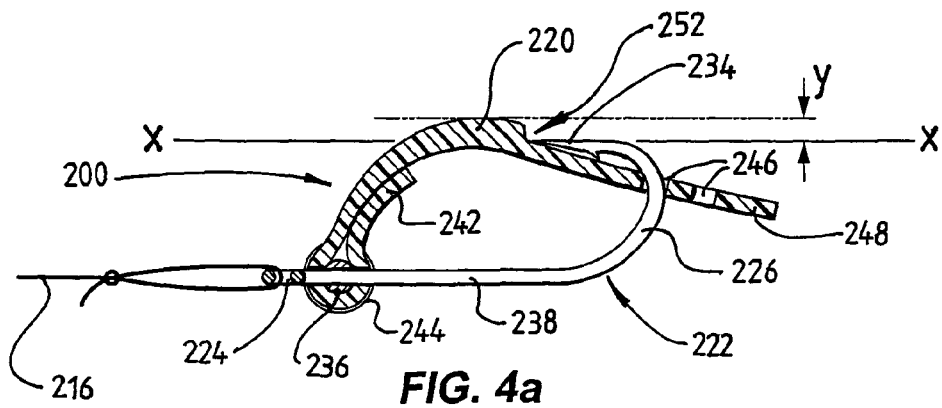
FIG. 4a is a cross-sectional side view of a second anti-snag fly fishing lure made in accordance with the teachings of the present disclosure.

In FIG. 4a, there is shown a second example fly fishing lure 200 (hereinafter simply referred to as "lure 200") made in accordance with the teachings of the present disclosure. Although specifically described as being suitable for fly fishing, it should be understood that lure 200 of the present disclosure may also be used with a spinning reel and rod, or the likes, and as such the disclosure should not be construed as limited to fly fishing use alone.

Lure 200 of FIG. 4a, is basically the same as that of lure 100 of FIGS. 3 & 5a to 5c, except lure 200 includes an additional feature that helps to prevent snagging of lure 200 on foreign matter during use. Referring to FIG. 4a, it can be seen that a step, ramp, or raised portion 252 is provided in/on elongated body 220, of lure 200, relative to hook point 234. The provision of step 252 provides greater protection against snagging as hook point 234 is concealed behind same during forward movement of lure 200.

Figure 4B:
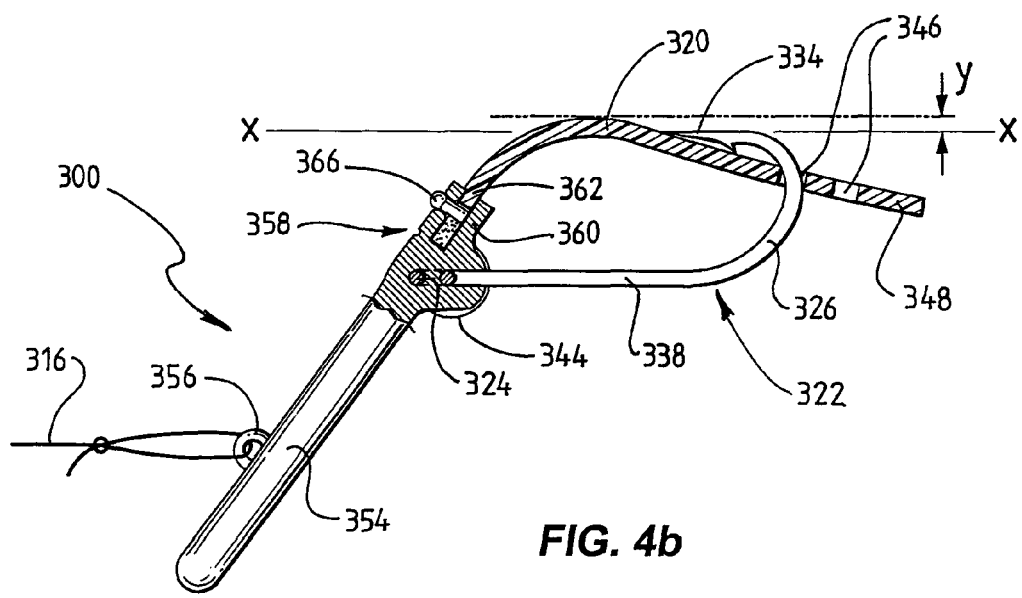
FIG. 4b is a cross-sectional side view of a hard bodied anti-snag fishing lure made in accordance with the teachings of the present disclosure.
Figure 4C:
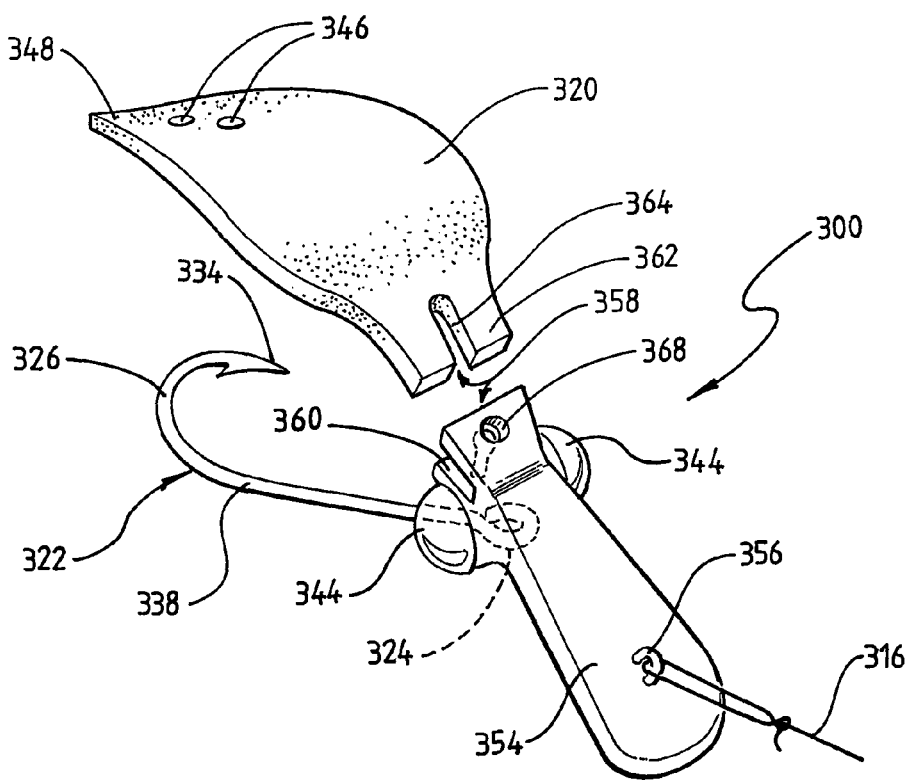
FIG. 4c is a perspective view of the hard bodied anti-snag fishing lure of FIG. 4c, showing the arced body portion of the lure removed to illustrate the ability to interchange body portions without having to remove the lure from the fishing line.

In FIGS. 4b & 4c, there is shown a hard or partially hard bodied fishing lure 300 (hereinafter simply referred to as "lure 300") made in accordance with the teachings of the present disclosure. Although specifically described as being suitable for spin fishing, it should be understood that lure 300 of the present disclosure may also be used with a fly reel and fly rod, or the likes, and as such the disclosure should not be construed as limited to spin fishing use alone.

Lure 300 of FIGS. 4b & 4c includes a large bib or swim lip 354 having an eye 356 for attaching line 316 to lure 300 disposed at one end thereof, and means 358 for receiving a removably attachable arced elongated body section 320 disposed at the other end thereof. By providing an eye 356 on bib 354 of lure 300 for attaching line 316 to lure 300, arced body sections 320 can be interchanged without having to remove lure 300 from line 316.

Although specifically described as including a bib or swim lip 354, it should be appreciated that alternative examples (not shown) of hard bodied lure 300 may also be provided without a bib or swim lip 354. As lure 300 includes an arced elongated body section 320 (a preferred removably attachable version thereof), similar to that of lures 100, 200, lure 300 can still provide bib-like movement and/or vibration without the addition of an actual bib or swim lip 354. In an alternative example (not shown), means 358 of lure 300 may be designed as a connecting block, or the likes, that can be coupled to fishing hook 322 in order to enable elongated body section 320 to be removably attached thereto. Accordingly, the present disclosure should not be construed as limited to the specific example shown in the drawings.

As can be best seen in FIG. 4c, the means 358 for removably attaching arced body sections 320 to lure 300 preferably includes a slot or recess 360 for receiving a tongue 362 of arced body sections 320 therein. Tongues 362 of arced body sections 320 are provided with slots 364, or holes (not shown), for receipt of a locking pin 366 (see FIG. 4b) that passes through a hole 368 provided in bib 354. In use, when a fisherman (not shown) selectively chooses to interchange an arced body section 320 of lure 300, he/she can do so by first removing locking pin 366 from bib 354, and then pulling and/or forcing tongue 362 of arced body section 320 away from, or out of recess 360. He or she is then free to attach a new or different arced body section 320 to lure 300 in a reverse manner to that previously described.

Although a specific example of means 358 of removably attaching arced body sections 320 to bib 354 of lure 300 has been provided, there are many other ways in which this could be achieved. As such, the present disclosure should not be construed as limited to the specific examples provided. Similarly, although hook 322 of lure 300 is shown as being permanently connected to bib 354 by way of being set therein during manufacture, it should be appreciated that same may be removably attached thereto by the provision of a recess, or the likes, and as such, such variations are intended to be included within the scope of the present disclosure. Finally, given that means 358 and bib 354 provide a convenient location for interconnection with arced body sections 320, of lure 300, it will be appreciated that arced body sections 320 need not be flexible or pliable. A rigid body section 320 could operate in a similar fashion to that of the flexible body sections 320 defined if such rigid body sections were to be pivotally attached to bib 354 by way of, for example, a suitable hinge means (not shown). In this way, upon a fish striking at lure 300, arced body section 320 would pivot away from hook point 334, exposing hook point 334, which will hopefully lead to the fish being caught.

Figure 6A:
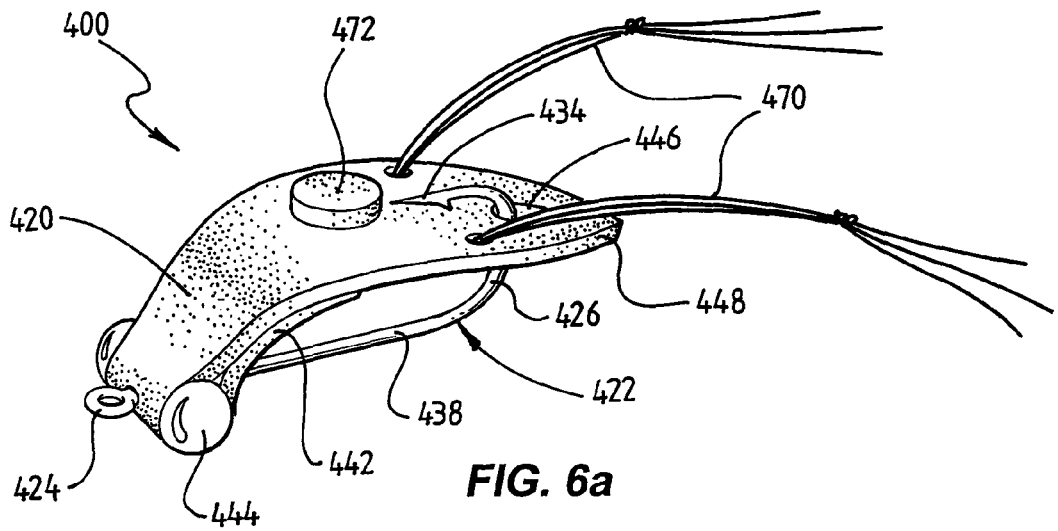
FIG. 6a is a perspective view of a fourth example anti-snag fly fishing lure made in accordance with the teachings of the present disclosure, the fly fishing lure designed to resemble a frog when drawn through the water.
Figure 6B:
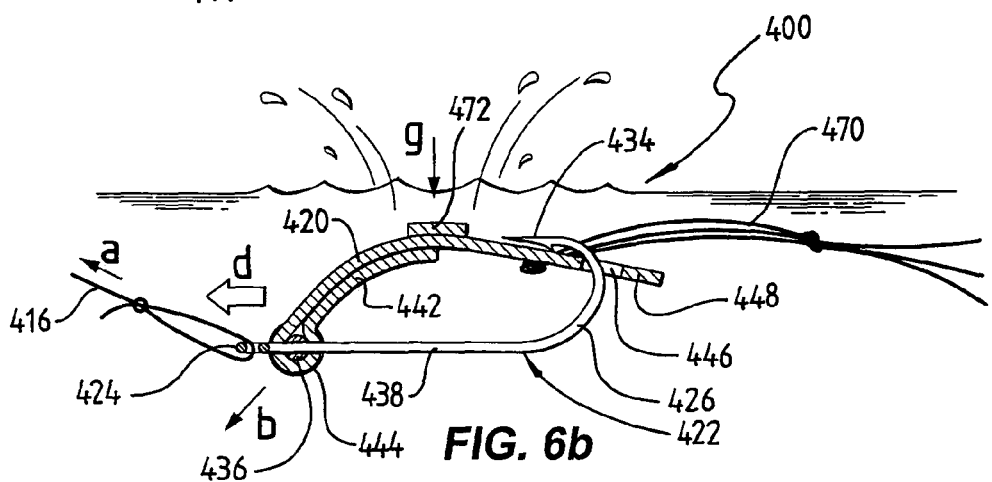
FIG. 6b is a cross-sectional side view of the anti-snag fly fishing lure of FIG. 6a, illustrating the way in which the lure makes a 'pop-like' sound as it is drawn through the water.
Figure 6C:
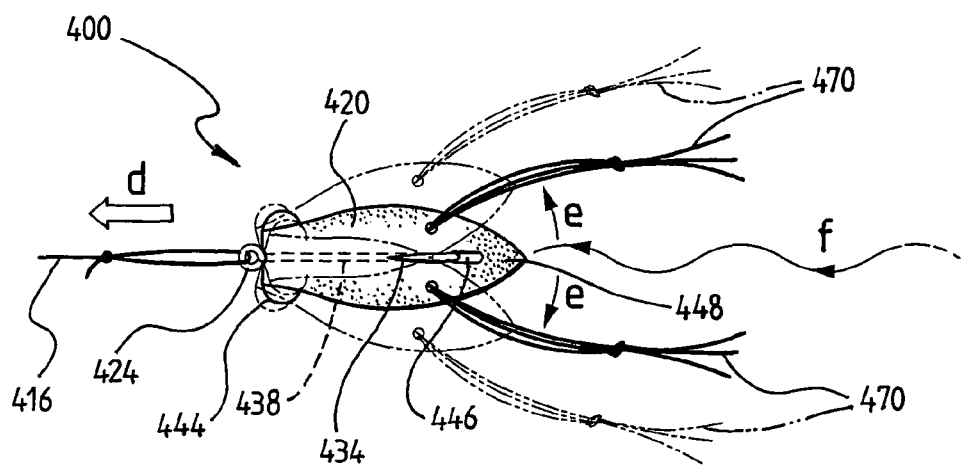
FIG. 6c is a partial cross-sectional plan view of the anti-snag fly fishing lure of FIGS. 6a & 6b, illustrating the way in which the lure moves and/or vibrates as it is drawn through the water.

In FIGS. 6a to 6c, there is shown a fly fishing lure 400 (hereinafter simply referred to as "lure 400") made in accordance with a fourth preferred example of the present disclosure. Although specifically described as being suitable for fly fishing, it should be understood that lure 400 of the present disclosure may also be used with a spinning reel and rod, or the likes, and as such the disclosure should not be construed as limited to fly fishing use alone.

Lure 400 of FIGS. 6a to 6c, is very similar to that of lure 100 of FIGS. 3 & 5a to 5c, or lure 200 of FIG. 4a, except lure 400 includes a number of additional features that help to 'add life' to lure 400 during use. Lure 400 is purposely designed to resemble a frog when drawn through the water. For this reason, attached near the tail 448 of lure 400 is a pair of elongated leg-like devices 470 that trail behind lure 400 during use, and wobble and/or move with lure 400 as same is drawn through the water.

Referring to FIGS. 6a & 6b, it can be seen that lure 400 also includes a deflecting means, or button 472, disposed on the upper surface of elongated body 420, adjacent and in front of hook point 434. The provision of this button 472 serves at least two purposes. The first, and most important purpose being that it creates a 'pop-like' sound as lure 400 is drawn through the water which helps to 'add life' to lure 400 during use. The 'pop-like' sound is created as a result of lure 400 bobbing under the water surface in the direction of arrow g as it is drawn through, and up and down, in the water in the direction of arrows d, b. The second purpose of button 472 is simply provided as a result of the positioning of same. That being, button 472 also helps to prevent snagging of lure 400 on foreign matter during use, as hook point 434 is concealed behind same during forward movement of lure 400.

Figure 7A:
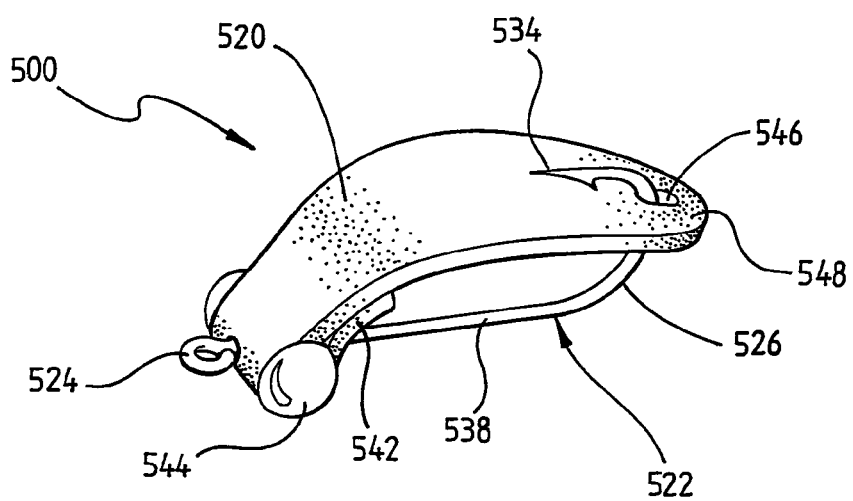
FIG. 7a is a perspective view of a fifth example anti-snag fly fishing lure made in accordance with the teachings of the present disclosure.
Figure 7B:
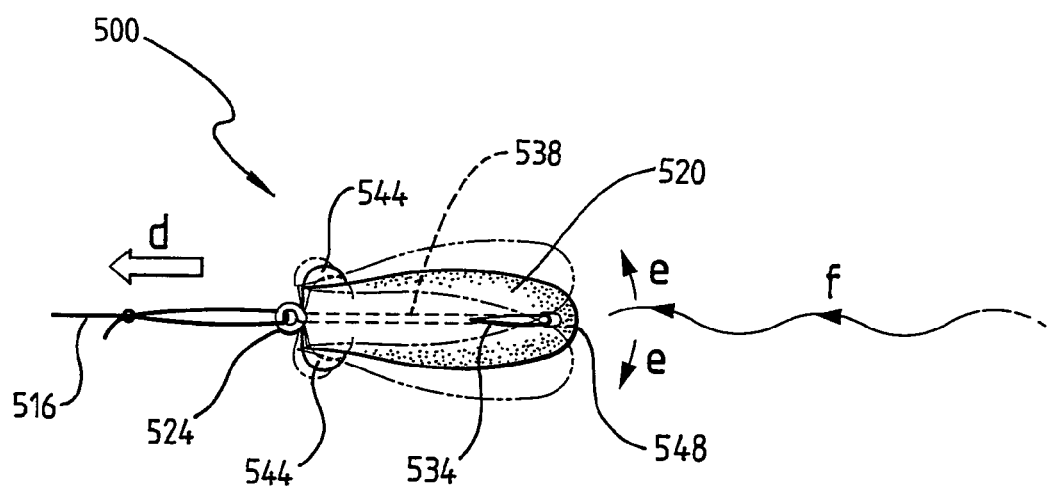
FIG. 7b is a partial cross-sectional plan view of the anti-snag fly fishing lure of FIG. 7a, illustrating the way in which the lure moves and/or vibrates as it is drawn through the water.

In FIGS. 7a & 7b, there is shown a fly fishing lure 500 (hereinafter simply referred to as "lure 500") made in accordance with a fifth preferred example of the present disclosure. Although specifically described as being suitable for fly fishing, lure 500 of the present disclosure may also be used with a spinning reel and rod, or the likes, and as such the disclosure should not be construed as limited to fly fishing use alone.

Lure 500 of FIGS. 7a & 7b, is basically the same as that of lure 100 of FIGS. 3 & 5a to 5c, except the tail 548 of lure 500 is substantially round, rather than pointed, which alters the appearance of lure 500 when drawn through, or across, the water.

In FIGS. 8a to 8e, there is shown a number of different prior art anti-snag guards 600 for fishing lures or hooks, each of these prior art guards 600 being constructed out of pieces, or loops, or wire or monofilament. Whether assembled as including trailing pieces of wire 674 (see FIGS. 8a, 8c & 8e), or as including loops of wire 676 (see FIGS. 8b & 8d), these prior art guards 600 are designed to deflect a lure away from foreign material during use so that the lure does not become snagged. These types of prior art anti-snag guards 600 are only considered to, at best, provide marginal success at preventing snagging of a lure.

In FIGS. 9a to 10a, and 11 to 12c, there is shown an anti-snag guard 700 (hereinafter simply referred to as "snag guard 700") for a fishing lure or hook made in accordance with a first preferred example of the present disclosure. Snag guard 700 utilises similar principles of construction to that of the various examples of lures 100, 200, 300, 400, 500 described with reference to FIGS. 3 to 7b, and for that reason like reference numerals will be used for the purposes of the discussion that now follows.

Snag guards made in accordance with the present disclosure may, be fixed or non-adjustable relative to a fishing lure or hook (such examples not shown), but are preferably adjustable as is shown in the drawings. There are many variations of fixed and/or adjustable snag guards incorporating the principles of the present disclosure, and as such, the present disclosure should not be construed as limited to the specific examples provided.

Figure 9A:
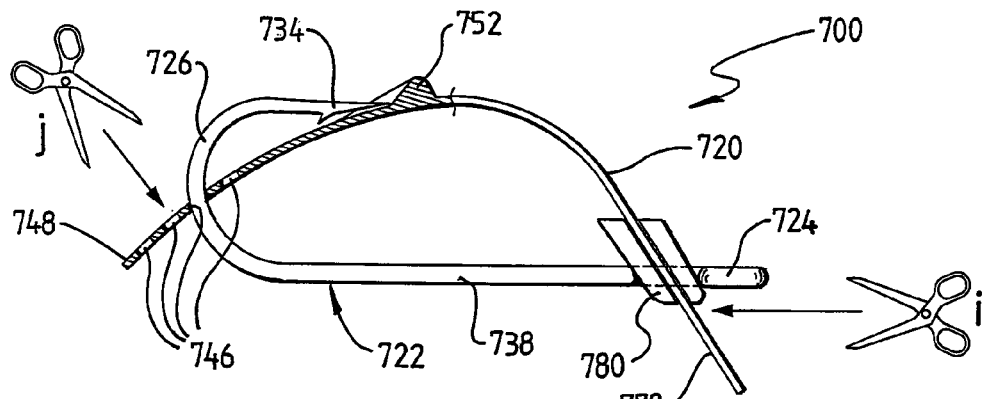
FIG. 9a is a side view of a first example adjustable anti-snag guard for a fishing lure or hook made in accordance with the teachings of the present disclosure, the anti-snag guard shown fitted to a fishing hook for illustrative purposes.
Figure 9B:
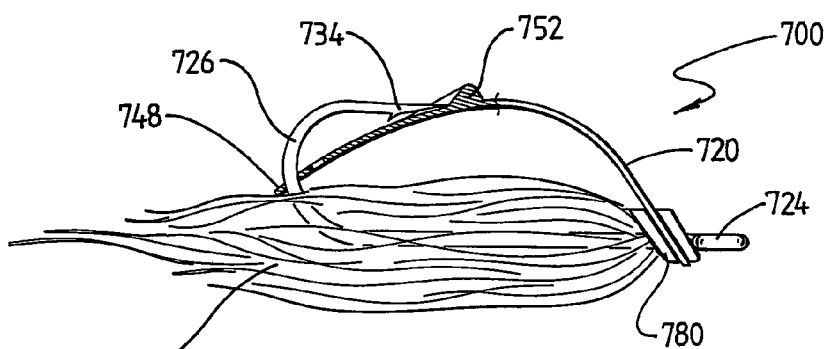
FIG. 9b is a side view of the of the anti-snag guard of FIG. 9a, this time showing the anti-snag guard fitted to a fly fishing lure.
Figure 10:
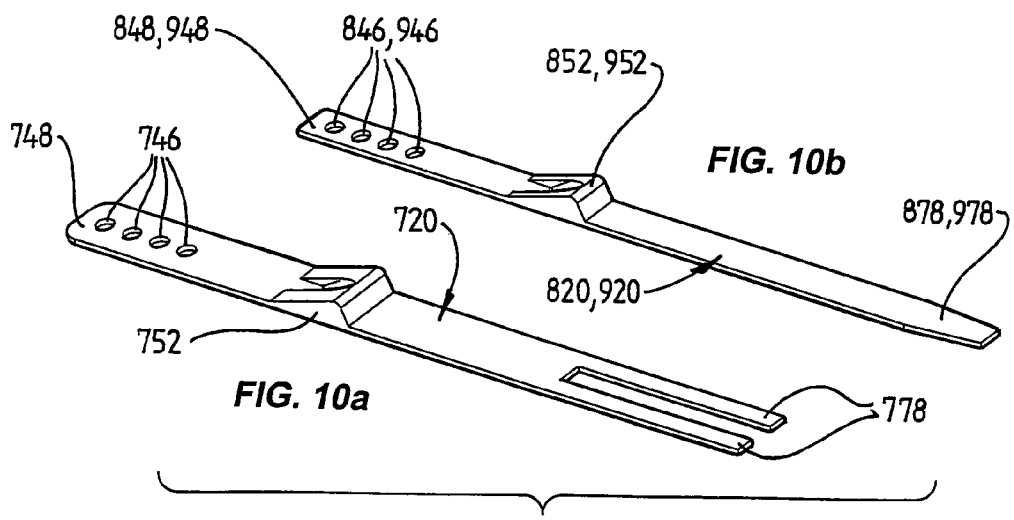

FIG. 9a illustrates the final stages of the fitting of an adjustable snag guard 700 to a fishing hook 722, wherein the only process that remains outstanding to complete the fitting process is the cutting off of the projecting legs 778 and/or tail 748 of the arced elongated body, or deflector portion 720 (as it will now also be referred to) once a desired arc is selected, as is indicated by the scissors marked with the numerals i, j. After cutting off the projecting legs 778 and/or tail 748 of arced body 720 of snag guard 700, hair, fur, feathers and/or other suitable materials 728 can be tied to hook 722, or snag guard 700, to construct a finished lure 700, as is shown in FIG. 9b.

In FIGS. 10a & 12a to 12c, the individual components that make up preferred adjustable snag guard 700 of the present disclosure are depicted separately to provide a better understanding of the interconnection of same.

In FIG. 10a, a perspective view of an arced elongated body 720 (or deflector portion) is shown which clearly illustrates that the preferred adjustability of snag guard 700 may be provided by way of two parallel legs 778 that have a slot defined therebetween, and/or a series of holes 746 provided relative to the tail section 748 of deflector portion 720. Parallel legs 778 enable the arc of deflector portion 720 to be varied by sliding legs 778 back and forth relative to a connecting block 780 (see FIGS. 11 to 12c), until such a time that a desired arc is achieved. Holes 746 enable the arc of deflector portion 720 to be varied by selectively threading hook 722 through a desired one of holes 746 provided at tail 748.

In FIG. 10a, it can also be seen that deflector portion 720 of snag guard 700 may be provided with a ramp or raised section 752 that acts as an additional means of deflecting foreign matter away from hook point 734 during use, therefore improving the anti-snag properties of snag guard 700 as hereinbefore described with reference to lures 100, 200, 300, 400, 500.

In FIG. 10b, a perspective view of an alternative arced elongated body 820, 920 (or deflector portion) is shown which varies to that of deflector portion 720 of FIG. 10a only in respect to the way in which the adjustability of snag guard 800, 900 (see FIGS. 13 & 14) is provided relative to a connecting block 880, 980. More particularly, deflector portion 820, 920 only includes a single leg or tongue 878, 978 (which may be tapered, as shown), which is received (and slides) within a single slot or recess 884, 984 of connecting block 880, 980 of snag guard 800, 900 (see FIGS. 13 & 14). The use of alternative deflector portion 820, 920, will be described in further detail below with reference to the second (see FIG. 13) and third (see FIG. 14) preferred snag guard 800, 900 examples of the present disclosure.

Figure 12A:
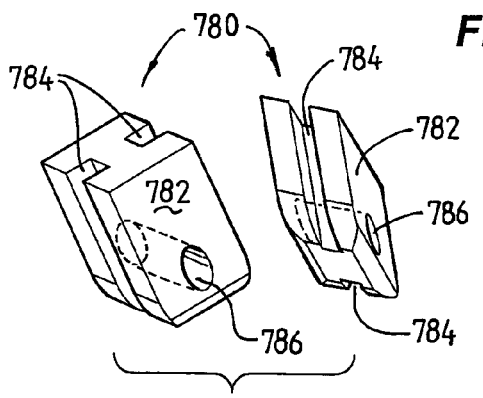
FIGS. 12a to 12c are various views of the connecting block portion of the anti-snag guard of FIGS. 9a, 9b & 11 which enables the deflector portion of FIG. 10a to be adjustably fitted to a fly fishing lure or hook.
Figure 12B:
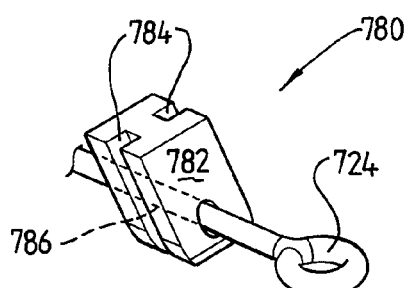
Figure 12C:
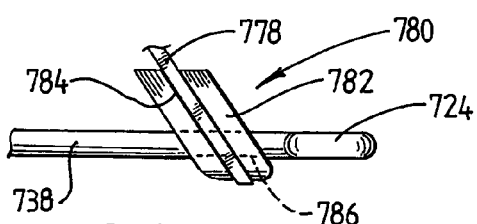

FIGS. 12a to 12c, show various views of a preferred connecting block 780 which is suitable for use with the preferred adjustable snag guard 700 shown in FIGS. 9a to 10a. This connecting block 780 includes a generally solid body 782 of any suitable material, as for example, rubber or plastics material, having a pair of slots 784 disposed along its side faces thereof that are provided for receiving the legs 778 of arced elongated body 720. Connecting block 780 also includes a slot or hole 786 for receiving shank 738 of hook 722 relative to hook eye 724.

Figure 11:
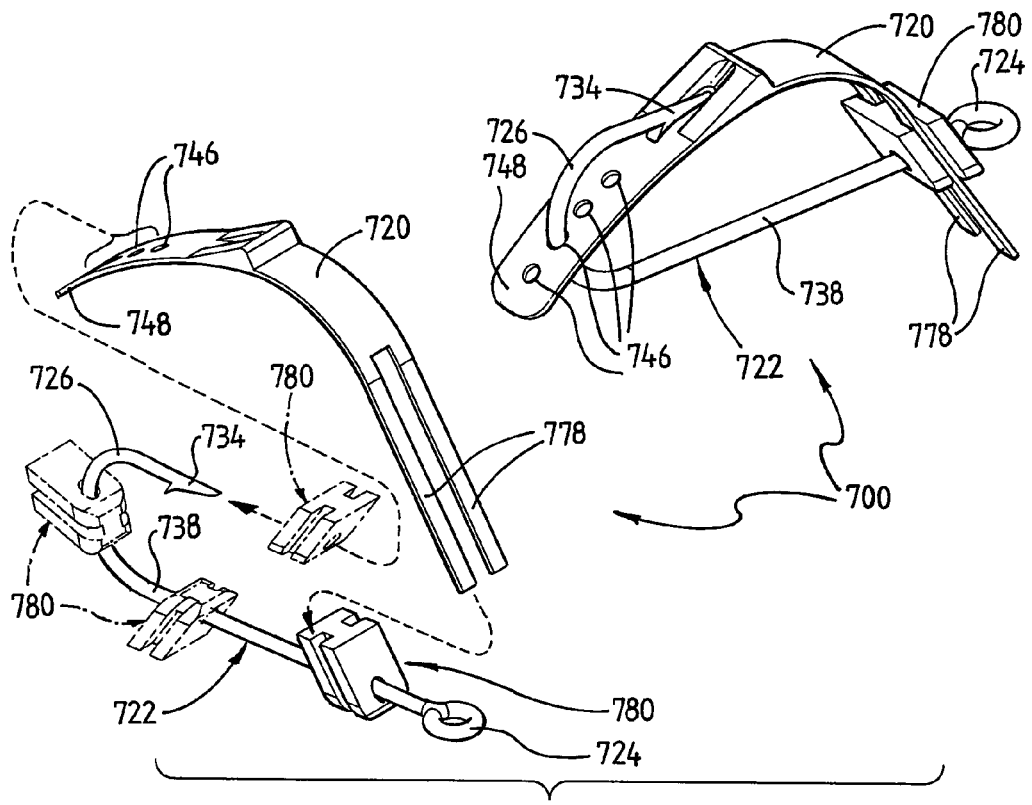
FIG. 11 is a diagram illustrating the way in which the deflector portion of FIG. 10a may be fitted to the remaining portion(s) of the anti-snag guard of FIGS. 9a & 9b.

FIG. 11 is an exploded view of adjustable snag guard 700 which illustrates the basic method of attaching same to hook 722. The first process involves the fitting, and positioning, of connecting block 780 adjacent hook eye 724. This process may require the use of glue, or the likes, depending on the material used in the construction of connecting block 780. After connecting block 780 is correctly fitted to hook 722 (i.e. threaded and/or slid into abutment with hook eye 724), hook point 734 is threaded through a selected one of holes 746 provided at the tail 748 of elongated body 720, opposite the end having legs 778. Legs 778 are then fed into, or placed in, slots 784 of connecting block 780 which then allows the arc of body 720 to be selectively adjusted to a desired configuration by sliding legs 778 back and forth within slots 784. Upon choosing a desired arc, and setting the position of same relative to connecting block 780, any projecting portions of legs 778 (and/or tail 748) may then be cut away as is illustrated by numerals i, j in FIG. 9a. Adjustable snag guard 700 is then fully fitted to hook 722, which is then ready for use.

Depending on the choice of materials used in the construction of connecting block 780, a frictional connection may be made between slots 784 and legs 778 of adjustable snag guard 700. Alternatively, glue and/or any other suitable means, as for example, pins, locking tabs, etc (not shown), may be required to maintain the chosen arc of elongated body (deflector portion) 720.

Although shown in FIGS. 9a to 12c, as including an arced elongated body 720 having a pair of parallel legs 778 that provide adjustability in cooperation with a pair of slots disposed on connecting block 780, it will be appreciated that the adjustability of a snag guard made in accordance with the disclosure may be provided in many other ways. As has been hereinbefore described, one such alternative arrangement (see, for example, FIG. 10b) may include an elongated body 820, 920 having a single leg, or tongue 878, 978, for receipt in a single slot of recess 884, 984 of a connecting block 880, 980.

Figure 13:
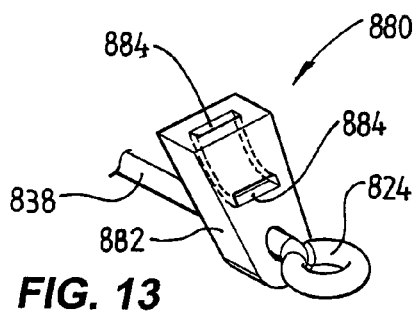
FIG. 13 is a perspective view of an alternative connecting block for an anti-snag guard for a fishing lure or hook made in accordance with the teachings of the present disclosure, the connecting block being suitable for use with the deflector portion shown in FIG. 10b.

In FIG. 13, the connecting block portion 880 of an adjustable snag guard 800 (not shown) made in accordance with a second preferred example of the present disclosure is shown. This connecting block 880 includes a single slot 884 for receiving a matched tongue 878 (FIG. 10b) of deflector portion 820 that can be fed into connecting block 880 at a top end thereof, and wherein any excess of tongue 878 can exit connecting block 880 mid-way down the front face thereof at the point where slot 884 terminates. The projecting tongue portion 878 can then be cut away as hereinbefore described.

Figure 14:
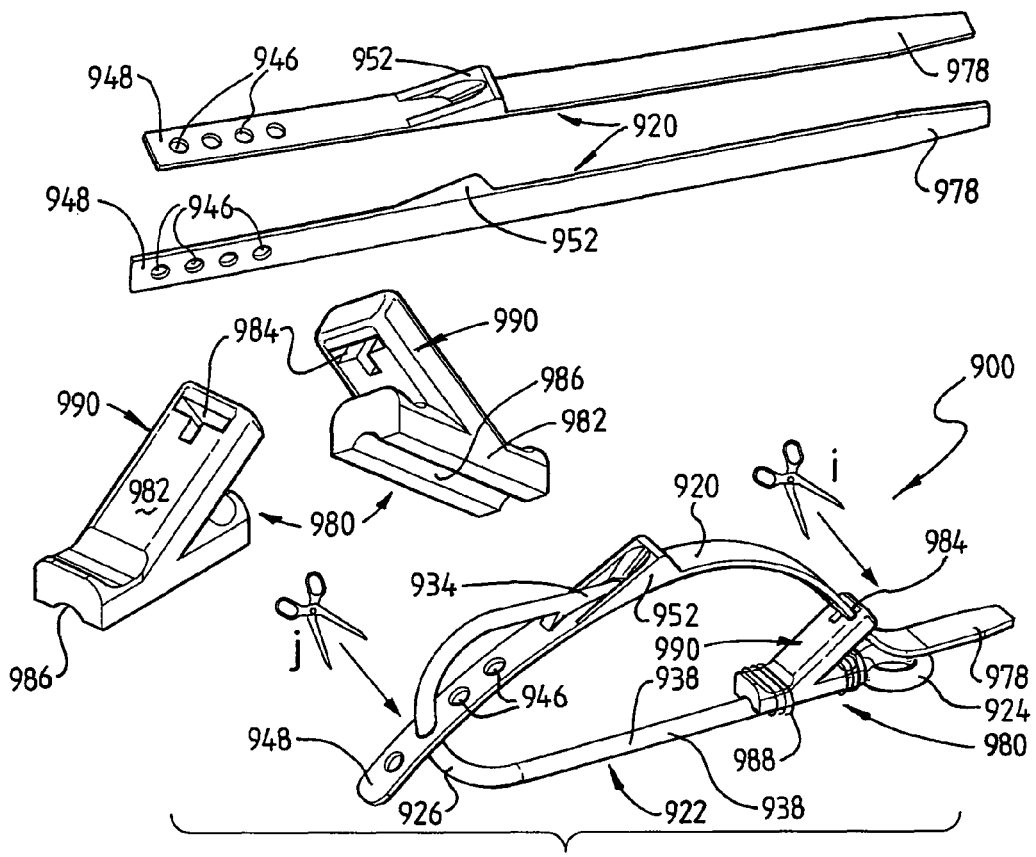
FIG. 14 is a diagram illustrating the way in which the deflector portion of FIG. 10b may be fitted to a connecting block of an anti-snag guard for a fishing lure or hook made in accordance with the teachings of the present disclosure, the anti-snag guard shown fitted to a fishing hook for illustrative purposes.

In FIG. 14, various views of an adjustable snag guard 900 made in accordance with a third preferred example of the present disclosure are shown. Like in the case of the second preferred snag guard 800 described with reference to FIGS. 10b & 13, this snag guard 900 also utilises a deflector portion 920 that is the same as the deflector portion 820, 920 described hereinabove with reference to FIG. 10b. However, this preferred snag guard 900 differs to that of snag guards 700, 800, with respect to the design of connecting block 980. More particularly, in FIG. 14 it can be seen that instead of including a slot of hole for attachment to hook shank 938 of hook 922, connecting block 980 includes a channel or groove 986 which is matched to the external surface of hook shank 938 such that when connecting block 980 is correctly positioned on hook shank 938, relative to hook eye 924, glue or thread 988 can be used to firmly affix connecting block 980 to hook 922.

To ensure that a desired arc is provided by deflector means 920 when snag guard 900 is fully assembled and fitted to hook 922, the slot 984 of connecting block 980 for receiving the tongue of deflector means 920 is provided at or near the protruding end of an arm 990 that extends outwardly from the remaining portion of connecting block 980 which includes groove 986.

Figure 15:
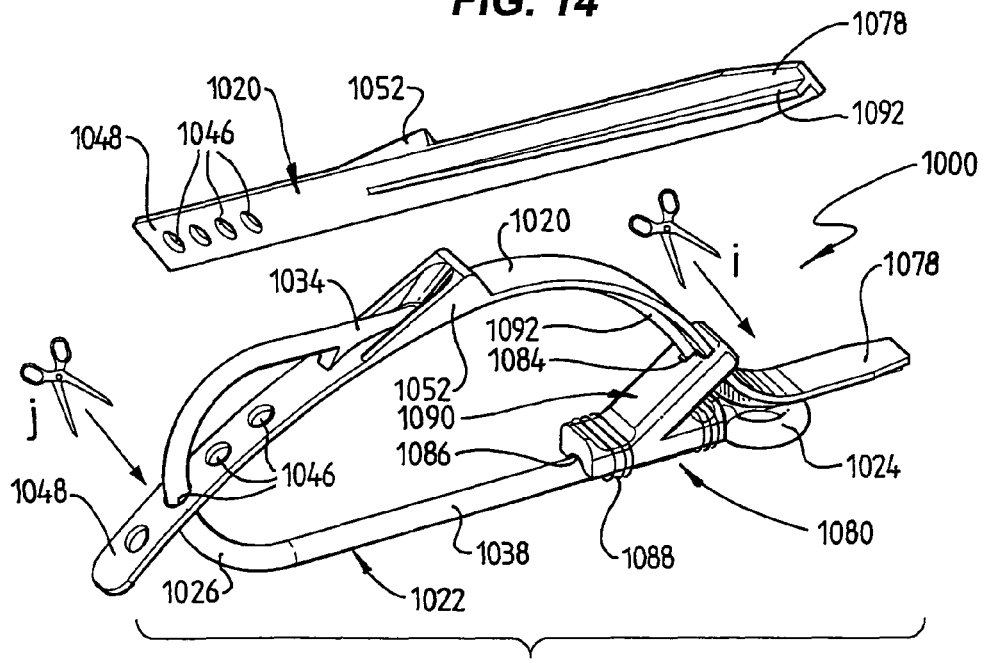
FIG. 15 illustrates various views of a fourth example anti-snag guard for a fishing lure or hook made in accordance with the teachings of the present disclosure, the anti-snag guard shown fitted to a fishing hook for illustrative purposes; and, FIG. 16 illustrates various views of a fifth example anti-snag guard for a fishing lure or hook made in accordance with the teachings of the present disclosure, the anti-snag guard shown fitted to a fishing hook for illustrative purposes.

In FIG. 15, various views of an adjustable snag guard 1000 made in accordance with a fourth preferred example of the present disclosure are shown. This example is similar to snag guard 900 shown in FIG. 14, and only differs thereto with reference to the construction of deflector portion 1020. More particularly, in FIG. 15 it can be seen that provided on the underside of defector portion 1020 is an integral ridge or fin 1092 which when received within the cooperating T-shaped slot 1084 of connecting block 1080 provides added stability and/or tensile strength to snag guard 1000 during use. That is, ridge 1092 helps to prevent lateral movement of, and provides added tensile strength to, deflector portion 1020, and hence, helps to maintain the desired arc of same, as hook 1022 is drawn through the water. The addition of ridge 1092 has been found to be particularly useful for large hooks 1022 having long shanks 1038, as without such a ridge 1092, deflector portion 1020 may need to be constructed of stronger materials to ensure that the required strength is provided during use.

Figure 16:
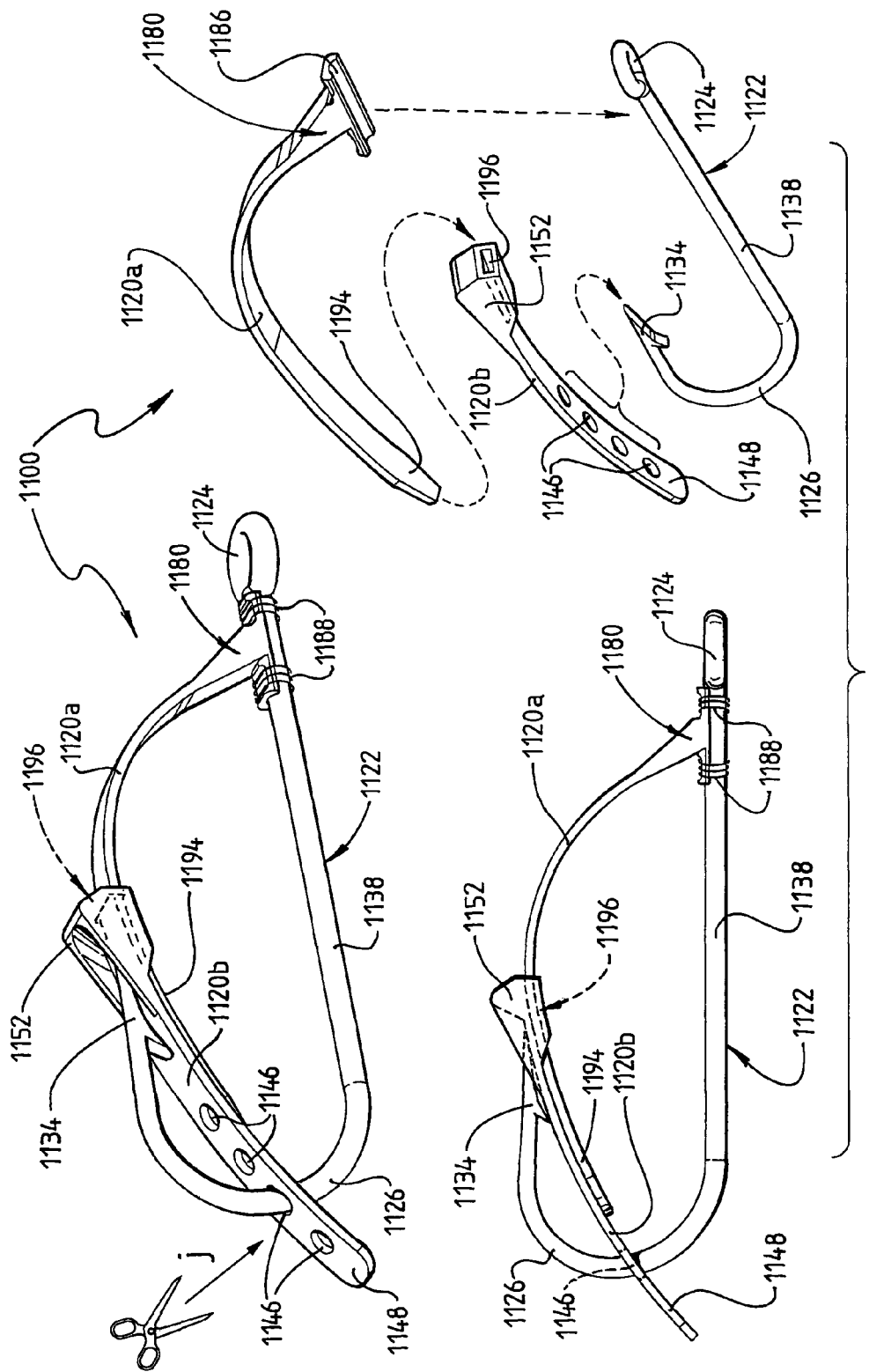

In FIG. 16, various views of an adjustable snag guard 1100 made in accordance with a fifth (and final) preferred example of the present disclosure are shown. In this example, instead of the adjustability of the snag guard being provided by a one-piece deflector portion that cooperates with a separate connecting block that is affixed to hook 1122, as was described with reference to snag guards 700, 800, 900, 1000, snag guard 1100 of FIG. 16 includes a two-part deflector portion 1120 having a first deflector section 1120a, which includes an integral connecting block 1180 disposed at an end thereof for interconnection with hook 1122 (at or near hook eye 1124), by way of glue, thread 1188, or the likes.

As can be seen in FIG. 16, at the other end of first deflector part 1120a is disposed a male coupling or tongue 1194, which is slidably received within a cooperating female coupling 1196 that together with male coupling 1194 provides the required adjustable connection between first and second deflector parts 1120a, 1120b, in order to achieve a desired arc configuration of snag guard 1100 when fully fitted to hook 1122.

The present disclosure therefore provides improved anti-snag fishing devices, preferably an anti-snag fishing lure and/or an anti-snag guard for a fishing lure or hook, having an arced body which deflects foreign matter away from the hook point(s) during use in order to prevent snagging. The arced body of the anti-snag fishing device of the present disclosure not only protects the hook(s) from snagging, but when embodied as a lure, also acts like a bib, or swim lip, which enables the device to move and/or vibrate when drawn through the water.

While specific examples have been described herein, further modification(s) are also possible. The present disclosure is intended to cover any variations, uses or adaptations of the disclosure following in general, the principles of the disclosure and including such departures from the present disclosure as come within known or customary practice within the art to which the invention pertains and as may be applied to the features hereinbefore set forth.

Finally the above described examples are not to limit the present invention. Various modifications and equivalent arrangements are intended to be included within the spirit and scope of the appended claims. Therefore, the specific examples contained herein are to be understood to be illustrative of some of the many ways in which the principles of the present invention may be practiced.

According to one aspect of the present disclosure, there is provided an anti-snag fishing device suitable for attachment to a fishing hook, said fishing hook having a hook eye, a shank, at least one curved hook section and at least one hook point, said anti-snag fishing device including an elongated planar body member which when fitted to said fishing hook forms an arc which projects upwardly from at or near said hook eye, reaches its highest point above the plane of said at least one hook point substantially parallel to said shank, then projects downwardly passing by and under said at least one hook point, until it finally terminates behind said at least one curved hook section of said fishing hook, wherein said anti-snag fishing device is attachable to said fishing hook at extremities of said elongated planar body member, and wherein, said anti-snag fishing device is adjustable relative to at least one extremity of said elongated planar body member such that said arc may be varied and/or said anti-snag fishing device can be fitted to fishing hooks of various sizes.

Preferably said arc of said elongated planar body member is maintained by way of threading said at least one hook point of said fishing hook through at least one hole or slot disposed at or near a tail extremity of said elongated planar body member, such that said elongated planar body member of said anti-fishing device is disposed relative to said at least one curved section of said fishing hook in a rest position of said elongated body member.

In a practical preferred example, said arc of said elongated body member is adjustable by way of the selective positioning of said fishing hook relative to a plurality of holes disposed at or near said tail section of said elongated body member.

Preferably said arc of said elongated body member of said anti-snag fishing device is provided under an adjustable level of tension by suitably selecting pliable or soft materials used to construct said elongated body member. It is also preferred that said at least one hook point is only exposed upon a downward force being applied to said arc of said elongated body member. Such a downward force being only likely to be applied by a fish striking at said anti-snag fishing device during use of same.

Preferably said arc of said elongated body member is provided with at least one step, ramp and/or raised portion, that further conceals said at least one hook point behind said highest point of said arc.

In a practical preferred example, said anti-snag fishing device is a fly fishing lure. Preferably said elongated body member is affixed to said fishing hook, at or near said hook eye, by way of a shaft or cylinder disposed perpendicular to said shank that provides a means of wrapping a tongue of said elongated body member thereabout to maintain said elongated body member connected to said fishing hook.

It is preferred that said fly fishing lure includes decorative eyes and/or any other suitable shiny or similar means affixed to ends of said shaft or cylinder. In some preferred examples, said fly fishing lure is designed to resemble a frog and includes at least two elongated leg-like members affixed to said elongated body, at or near said tail section, said leg-like members trailing behind said fly fishing lure during use. In some examples it is preferred that said tail section of said elongated body member is pointed or round depending on the prey or food said fly fishing lure is intending to imitate.

Preferably said fly fishing lure moves and/or vibrates during use by way of the arced configuration of said elongated body member. It is also preferred that said fly fishing lure tracks a substantially serpentine path as it is drawn through water.

In a preferred example, said fly fishing lure includes at least one button-like member, disposed on an upper surface of said elongated body member relative to, and at or near, said highest point of said arc, and is positioned in front of said at least one hook point. It is preferred that said button-like member provides an additional means of concealing said at least one hook point to further protect said fly fishing lure from snagging on foreign matter during use. Preferably said button-like member also causes said fly fishing lure to make a 'pop-like' sound during use as said fly fishing lure bobs up and down due to said arced configuration of said elongated body member.

In an alternative practical preferred example, said anti-snag fishing device is a hard bodied fishing lure for use with spinning fishing gear and tackle. Said hard bodied fishing lure including means for removably attaching said elongated body member thereto without the need to remove said hard bodied fishing lure from a fishing line. Preferably said means for removably attaching said elongated body member to said hard bodied fishing lure includes at least one eye for attachment to said fishing line.

In a practical preferred example, said means for removably attaching said elongated body member to said hard bodied fishing lure includes a bib or swim lip. Preferably said means for removably attaching said elongated body member to said hard bodied fishing lure includes a slot defined in one end of said bib that by way of a cooperating locking pin provides a means of maintaining said elongated body member affixed thereto.

In yet a further practical preferred example, said anti-snag fishing device is an anti-snag guard for a fishing lure or fishing hook. Preferably said anti-snag guard is adjustable by way of: at least one leg or tongue of said elongated body member that is/are received in a connecting block that is attachable to said fishing hook adjacent said hook eye; and/or, a plurality of holes disposed at or near said tail section of said elongated body member. Preferably said connecting block includes at least one cooperating slot or recess for receiving each of said at least one leg or tongue of said elongated body member of said anti-snag guard.

In an alternative preferred example, said elongated body member includes at least two body sections that are adjustably connectable to one another. Preferably a first body section includes at one end thereof an integral connecting block for attachment to said hook shank, at or near said hook eye, and at the other end thereof includes a male coupling for attachment to a second body section. Preferably said second body section includes a female coupling disposed at one end thereof that receives the male coupling of said first body section, and provides the required slidably adjustable connection therebetween, and at the other end thereof includes a plurality of holes for selective attachment to said hook.

Accordingly, the present disclosure provides improved anti-snag fishing devices, preferably an anti-snag fishing lure and/or an anti-snag guard for a fishing lure or hook, which protects the hook(s) from snagging on foreign matter during use.

An anti-snag fishing device of the present disclosure incorporates a body design having an arc which projects upwardly from near the eye of the hook(s), reaches its highest point above the plane of the hook point, then projects downwardly passing by and under the hook point, until it finally terminates behind the curved section of the hook(s) in order to deflect foreign matter away from the hook point during use, so that the fishing device does not become snagged.

When embodied as an anti-snag fishing lure, the arced design of the body of the lure of the present disclosure not only protects the hook(s) from snagging, but also acts like a bib, or swim lip, which enables the lure to move and/or vibrate when drawn through the water. In terms of fly fishing, this added movement is considered especially advantageous and has not before been achievable without the addition of a bib which can cause spinning of the fly during false casting, leading to casting difficulties and/or line tangling. The lure of the present disclosure does not suffer from the problems inherent with the addition of a bib since the arced body of the lure of the present disclosure does not protrude below the eye of the hook, which in terms of bibs, is seen as the major cause of the undesired spinning of known lures. Thus, the arced design of the body of the lure of the present disclosure enables the lure to vibrate and/or move like complex hard body lures.

Depending on the materials used in the construction of the anti-snag fishing device of the present disclosure, the arced body can be selectively provided under various levels of tension in order to act as a trigger that exposes the hook point only upon a fish striking at same. The level of tension, and hence the amount of pressure required to expose the hook point, can be selectively adjusted by the use of suitable materials. Providing the arced body under tension is especially advantageous at preventing snagging of a lure as the ability to deflect the lure from snagging on foreign matter is further increased. Furthermore, a step or ramp in or arranged on the body relative to the hook point, and/or the addition of a deflecting means positioned adjacent the hook point, both being preferred features of the present disclosure, also add to the effectiveness of the anti-snag fishing device of the present disclosure.

When embodied as an anti-snag guard for a fishing lure, the arced design of the body of the guard can be used to protect the hook(s) of any lure from snagging. The novel design and preferred adjustability of the guard of the present disclosure allows it to be easily fitted to any lure. It is considered that the anti-snag guard of the present disclosure is far more effective at preventing snagging than that of known wire or monofilament guards using trailing pieces or wire or wire loops.

Finally, when embodied as a hard body lure, the anti-snag fishing device of the present disclosure can function in the same or similar manner to that of known hard body lures, whilst at the same time offering anti-snag properties never before obtainable.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An anti-snag fishing device suitable for attachment to a fishing hook, said fishing hook having a hook eye, a shank, at least one curved hook section and at least one hook point, said anti-snag fishing device comprising:

a buoyant elongated planar body member which, when fitted to said fishing hook at or near said hook eye, forms an arc by projecting backwardly from at or near said hook eye toward said at least one curved hook section at an acute angle with respect to a plane of the shank, the arc defining a convex surface facing away from the shank, the arc reaching a highest point before said at least one hook point, the arc continues backward passing downwardly by and under said at least one hook point until the arc reaches a termination point at said at least one curved hook section, the termination point corresponding to a point of contact between a slot or hole in the elongated planar body member and the at least one curved hook section, the slot or hole contacting the at least one curved hook section to maintain the arc in position relative to the at least one curved hook section, a portion of the planar body member is to deform when a force is applied to the planar body member towards the shank at the highest point of the arc such that the portion of the planar body member deforms to define a concave surface facing away from the shank, the deformed portion of the planar body member to expose the hook point, at least one feature of said elongated planar body member imitates the appearance of fish prey, and a configuration of the arc of the elongated planar body member enables said anti-snag fishing device to move like fish prey by causing it to dive and at least one of wobble or vibrate from side to side so that said anti-snag fishing device travels in a substantially serpentine path when drawn through water without an angler having to impart the fish-prey-like movement.

2. The anti-snag fishing device as claimed in claim 1, wherein said slot or hole is to be disposed at or near a tail extremity of said elongated planar body member.

3. The anti-snag fishing device as claimed in claim 2, wherein said slot or hole further comprises a plurality of slots or holes and said arc of said elongated planar body member is adjustable by way of a selective positioning of said fishing hook relative to said plurality of slots or holes disposed at or near said tail extremity of said elongated planar body member.

4. The anti-snag fishing device as claimed in claim 3, wherein said device is a fly fishing lure.

5. The anti-snag fishing device as claimed in claim 4, wherein said elongated planar body member, when fitted to said fishing hook at or near said hook eye, is attachable to said fishing hook, at or near said hook eye, by way of a shaft or cylinder disposed substantially perpendicular to said shank that provides a means of wrapping a tongue extremity of said elongated planar body member thereabout to maintain said elongated planar body member connected to said fishing hook.

6. The anti-snag fishing device as claimed in claim 5, further including decorative eyes affixed to ends of said shaft or cylinder to make said fly fishing lure appear more 'life-like' during use.

7. The anti-snag fishing device as claimed in claim 4, wherein said fly fishing lure is designed to resemble a frog and includes at least two elongated leg-like members affixed to said elongated planar body member, at or near said tail extremity, said leg-like members trailing behind said fly fishing lure during use.

8. The anti-snag fishing device as claimed in claim 4, wherein said tail extremity of said elongated planar body member is pointed or rounded depending on the prey or food said fly fishing lure is intending to imitate.

9. The anti-snag fishing device as claimed in claim 4, further including at least one button-like member, disposed on an upper surface of said elongated planar body member relative to, and at or near, said highest point of said arc, and positioned in front of said at least one hook point.

10. The anti-snag fishing device as claimed in claim 9, wherein said at least one button-like member conceals said at least one hook point to further protect said fly fishing lure from snagging on foreign matter during use.

11. The anti-snag fishing device as claimed in claim 9, wherein said at least one button-like member causes said fly fishing lure to make a 'pop-like' sound during use as said fly fishing lure bobs up and down due to the configuration of the arc of said elongated planar body member.

12. The anti-snag fishing device as claimed in claim 1, wherein said elongated planar body member comprises a pliable or soft material such that the body is under an adjustable level of tension when engaged to the hook.

13. The anti-snag fishing device as claimed in claim 1, wherein said at least one hook point of said fishing hook is only exposed upon a downward force being applied to said arc of said elongated planar body member.

14. The anti-snag fishing device as claimed in claim 1, wherein said elongated planar body member is provided with at least one step, ramp and/or raised portion, that further conceals said at least one hook point behind said highest point of said arc.

15. The anti-snag fishing device as claimed in claim 1, wherein said device is a hard or soft bodied fishing lure for use with spinning fishing gear and tackle.

16. The anti-snag fishing device as claimed in claim 15, further including means for removably attaching said elongated planar body member to said hard or soft bodied fishing lure without the need to remove said hard or soft bodied fishing lure from a fishing line.

17. The anti-snag fishing device as claimed in claim 16, wherein said hard or soft bodied fishing lure includes at least one eye for attachment to said fishing line.

18. The anti-snag fishing device as claimed in claim 17, wherein said hard or soft bodied fishing lure includes a bib or swim lip.

19. The anti-snag fishing device as claimed in claim 18, wherein said means for removably attaching said elongated planar body member to said hard or soft bodied fishing lure includes a slot defined in one end of said bib or swim lip that by way of a cooperating locking mechanism provides a means of maintaining said elongated planar body member affixed thereto.

20. The anti-snag fishing device as claimed in claim 1, wherein said anti-snag fishing device is adjustable relative to at least one extremity of said elongated planar body member such that, said arc may be varied and/or said anti-snag fishing device can be fitted to fishing hooks of different sizes.

21. The anti-snag fishing device of claim 1, wherein the acute angle at which the planar body member projects backwardly from at or near said hook eye creates a projectile profile when fitted to the fishing hook.

22. The anti-snag fishing device of claim 1, wherein the acute angle at which the planar body member projects backwardly from at or near said hook eye is to act like a bib or swim lip when fitted to the fishing hook.

23. The anti-snag fishing device of claim 1, wherein the elongated planar body member is of sufficient width to enable said anti-snag device to dive and move like fish prey in the substantially serpentine path.

24. The anti-snag fishing device of claim 1, wherein the elongated planar body member imitates the appearance of fish prey.

25. The anti-snag fishing device of claim 1, wherein a width of the elongated planar body member is shaped to imitate the appearance of fish prey when fitted to the fishing hook.

26. The anti-snag fishing device of claim 1, wherein a central portion of the elongated planar body member is wider than ends of the elongated planar body member.

27. The anti-snag fishing device of claim 1, wherein the highest point is to be closer to the at least one hook point than an intersection of the arc with the shank when measured in a direction parallel to the plane of the shank.

* * * * *